Dec. 14, 1954     T. B. HAUFE ET AL     2,697,030
APPARATUS FOR THE MANUFACTURE OF ORGANIC COMPOUNDS
Original Filed Feb. 26, 1949
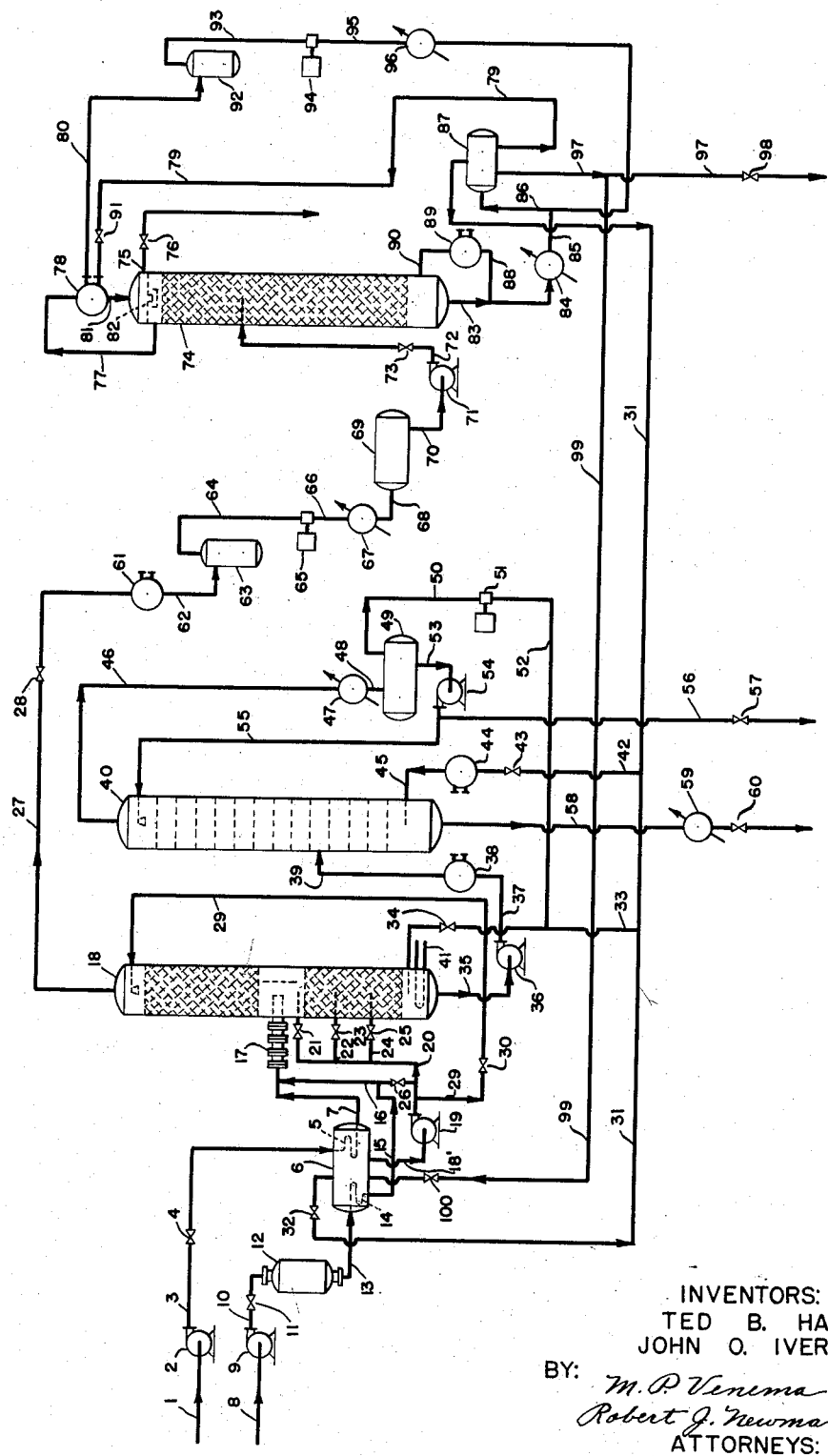
INVENTORS:
TED B. HAUFE
JOHN O. IVERSON
BY: *M. P. Venema*
*Robert J. Newman*
ATTORNEYS:

United States Patent Office 2,697,030
Patented Dec. 14, 1954

2,697,030

APPARATUS FOR THE MANUFACTURE OF ORGANIC COMPOUNDS

Ted B. Haufe, Western Springs, and John O. Iverson, Chicago, Ill., assignors to Universal Oil Products Company, Chicago, Ill., a corporation of Delaware Original application February 26, 1949, Serial No. 78,588, now Patent No. 2,631,161, dated March 10, 1953. Divided and this application May 23, 1952, Serial No. 289,454

5 Claims. (Cl. 23—260)

This application is a division of our previously filed application relating to the Manufacture of Organic Compounds, Serial Number 78,588, filed February 26, 1949, now Patent No. 2,631,161.

This invention relates to a means for manufacturing dimethyl hydrogen phosphite, and more particularly to an improved unitary apparatus suitable for producing relatively high yields of this desired material.

Dimethyl hydrogen phosphite is produced by the interaction of phosphorus trichloride and methanol in accordance with the following equation:

$$PCl_3 + 3CH_3OH \rightarrow HPO(OCH_3)_2 + CH_3Cl + 2HCl$$

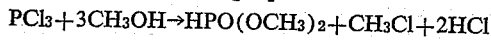

This reaction takes place spontaneously when methanol and phosphorus trichloride are mixed. The reaction is exothermic to the extent of about 32 kcal. per mole of phosphorus trichloride (420 B. t. u./lb.) on the basis of phosphorus trichloride, methanol and dimethyl hydrogen phosphite being liquids and of methyl chloride and hydrogen chloride being present as gases. Actually at least one-half of the hydrogen chloride remains in the liquid product, at least partially in chemical combination with the dimethyl hydrogen phosphite. Under these circumstances the actual heat of reaction is from 50 to 100% greater than that mentioned above. In order to control the reaction, cooling of the reaction mixture is obtained by recycling liquid methyl chloride so that about 5 to about 10 moles of liquid methyl chloride is admixed with one mole of phosphorus trichloride charged to the process or on a weight basis this corresponds to about 2.5 to about 5 pounds of liquid methyl chloride per pound of phosphorus trichloride.

The process and apparatus for effecting the production of dimethyl hydrogen phosphite is set forth and illustrated in more detail hereinafter, and includes the following improvements and refinements in design over those used heretofore.

(1) Precooling of the reactants to reaction temperatures of from about −30° to about +10° C. in external coolers.

(2) Mixing of phosphorus trichloride and methyl chloride and contacting the mixture with methanol in a jet type mixer with a minimum of residence time between intimate contacting of reactants and separation of hydrogen chloride product from the liquid reaction products.

(3) Operation of the degassing or stripping column at essentially the same pressure as the reactor by providing sufficient methyl chloride stripping vapors to maintain the partial pressure of hydrogen chloride at less than that in the low pressure degassing column used heretofore.

(4) Addition of a fractionation section, above the stripping section, which is refluxed with liquid methyl chloride to insure complete removal of dimethyl hydrogen phosphite from the hydrogen chloride-methyl chloride vapors leaving the column.

(5) Substitution of high pressure fractionation system for separation and recovery of hydrogen chloride and methyl chloride in the anhydrous state in place of a water absorption system as used heretofore.

(6) Preheating and vaporization of the dimethyl hydrogen phosphite in the charge to the distillation rerun column with addition of a stripping section for countercurrent stripping of the bottoms product with methyl chloride vapors to improve the recovery of dimethyl hydrogen phosphite from the bottoms product.

One embodiment of the means for effecting the reaction between phosphorus trichloride and methanol in producing dimethyl hydrogen phosphite comprises in combination, an elongated reactor-stripping chamber having upper and lower packed sections, a reactant stream flow mixer connecting to the side of the said chamber and discharging into a vapor disengaging section positioned between the upper and lower packed sections of the chamber, a plurality of stripping fluid inlets connecting with the lower portion of the chamber and discharging into said lower packed sections at vertically spaced levels therein, whereby methyl chloride may be injected into the presence of the resulting product stream flowing down through the chamber and prevent any undesired side reaction between the resulting dimethyl hydrogen phosphite and hydrogen chloride, heating means connecting with the lower portion of the chamber suitable to provide for the vaporizing of the methyl chloride, a reflux stream inlet connecting with the upper portion of the chamber whereby methyl chloride may also be used to remove entrained dimethyl hydrogen phosphite from the overhead vapor stream, and product outlets from both the upper and lower ends of the said reactor-stripping chamber.

One means for carrying out the process of this invention is illustrated diagrammatically by the attached drawing which shows in general side elevation a combination of equipment suitable for effecting the process. In accordance with the means illustrated in the drawing, methanol is introduced through line 1 to pump 2 which discharges through line 3 and valve 4 into cooling coil 5 which is disposed in reactant cooler 6 in which liquefied methyl chloride, recovered as hereinafter set forth, is permitted to vaporize. The cooled methanol is then directed from coil 5, through line 7, to reactor mixer 17. Also from another outside source, phosphorus trichloride is directed through line 8, pump 9, which discharges through line 10 and valve 11 to filter 12, from which the phosphorus trichloride is directed through line 13, to cooling coil 14, which is also disposed in reactant cooler 6. From cooling coil 14, the cooled stream of phosphorus trichloride is discharged therefrom through line 15 into line 16 where it is diluted with liquid methyl chloride introduced as hereinafter set forth.

The precooled stream of methanol being introduced through line 7 and the precooled mixture of phosphorus trichloride and methyl chloride are commingled rapidly in reactant mixer 17 in which the heat of reaction at the point of contact is highly exothermic and is estimated to be about 630 B. t. u./lb. of phosphorus trichloride charged. The heat of reaction is removed by vaporization of the methyl chloride from the reaction mixture. The methyl chloride required for removing this quantity of heat and maintaining the reaction mixture at a temperature of from −30° to about 10° C. or preferably at −20° to 0° C. or lower is mixed with the phosphorus trichloride charged prior to contact with methanol in order to insure adequate cooling without localized overheating in the reaction zone. The reactor mixer 17 must be so designed as to provide sufficient pressure drop and turbulence in the mixing zone to effect an intimate contact of the phosphorus trichloride and methanol immediately prior to discharge of the effluent into reactor stripper 18 in the vapor disengaging space provided between a lower bed and an upper bed of carbon Raschig rings. For example, in a reactor stripper 44 feet long and of 4.5 feet internal diameter, the lower bed of carbon Raschig rings is 20 feet thick and the upper bed is 10 feet in thickness.

In some cases mixer 17 may not be used but the reactants may be commingled in the vapor disengaging space in reactor stripper 18.

The reaction between the methanol and phosphorus trichloride to produce dimethyl hydrogen phosphite is completed in the reactor-stripper while the liquid passes downward through the stripping section of the reactor-stripper column 18 countercurrent to methyl chloride vapors generated in the reboiler or introduced from the reactant cooler 6 by way of line 31, valve 32, line 33, and valve 34. A portion of the methyl chloride may be introduced as liquid from reactant cooler 6 by way of line 18' and pump 19 which discharges into header 20 provided with valve 21 and attached to branch lines 22 and 24 containing valves 23 and 25 respectively. Also a portion of the methyl chloride being discharged to header 20 is directed therefrom through line 16 already mentioned containing valve 26. Reactor-stripper 18 may also be operated sometimes without adding methyl chloride through lines 20, 22, and 24 as indicated above.

The reactor stripper is designed for operation at an absolute pressure of about 350 mm. of mercury, instead of at a pressure of about 50 mm. of mercury as employed heretofore. This increase in the mentioned operating pressure is compensated for by increasing the quantity of methyl chloride stripping vapors, thereby lowering the partial pressure of hydrogen chloride in the mixture, and accordingly decreasing the tendency of the dimethyl hydrogen phosphite to react further with hydrogen chloride to produce additional methyl chloride at the expense of the desired dimethyl hydrogen phosphite. The temperature of the lower section of the reactor-stripper column may be controlled by varying the amount of methyl chloride introduced by lines 20, 22 and 24 into the liquid mixture and passing downwardly through the column. The hydrogen chloride which is stripped from the dimethyl hydrogen phosphite and higher boiling products in reactor stripper 18 and also the methyl chloride are directed from the top of reactor stripper 18 through line 27 containing valve 28 to further compression, liquefaction, and fractional distillation as hereinafter set forth. The reactor-stripper column is preferably provided with a reflux of liquid methyl chloride which is introduced from line 29 and valve 30 to near the top of the fractionator 18 already mentioned to maintain a temperature therein of about −45° C. in order to insure substantially complete removal of the entrained dimethyl hydrogen phosphite from the overhead vapors passing to the compressors. As a mixture of dimethyl hydrogen phosphite and hydrogen chloride is extremely corrosive, the complete removal of dimethyl hydrogen phosphite is essential for satisfactory operation of the compressor system.

The cost of plant construction may be lowered considerably by increasing the operating pressure of the reactor-stripper column. For example, one stage of the usual three-stage compressor system could be eliminated if the pressure in the column is increased to approximately 1.3 atmospheres absolute. The operating pressure in the reactor-stripper is generally from about 0.25 to about 3.0 atmospheres. The cost of the alloy lined column can also be reduced when the operating pressure is increased and the operation can be simplified in general by operating at slightly above atmospheric pressure. The temperature can still be maintained in the desired low range by increasing the concentration of methyl chloride in the mixture.

As already indicated, the charged methanol and phosphorus trichloride are precooled by indirect heat exchange with vaporizing methyl chloride in reactant cooler 6. The vapors so produced are directed from cooler 6, through line 31 and valve 32 and at least a portion thereof is conducted through branch line 33 containing valve 34 to near the bottom of reactor-stripper 18 and utilized therein as a stripping agent for removing hydrogen chloride from the reaction mixture present therein. The stripping is thus improved by introducing methyl chloride which is free from hydrogen chloride as stripping vapors at the bottom of column 18.

From the bottom of reactor-stripper 18, the mixture of dimethyl hydrogen phosphite and higher boiling products is conducted through line 35 to pump 36, which discharges through line 37, heat exchanger 38, and line 39, into rerun column 40. Heat may be added to the bottom of reactor-stripper 18 by means of steam or other heating medium circulated through reboiler coil 41. Alternatively, a portion of the material being discharged through line 35 may be passed through an external reboiler coil, not shown in the drawing, and be returned to the bottom of reactor-stripper 18.

Rerun column 40 may be a vertical cylindrical vessel provided with a plurality of perforated plates or decks to assist in the fractional distillation. For example, a rerun column with an inside diameter of 3.5 feet and a length of 44 feet is provided with 25 decks arranged with a 1.5 foot space between decks. This rerun column is designed for fractionally distilling and separating the dimethyl hydrogen phosphite from higher boiling by-products. The maximum temperature allowable to avoid decomposition of the heavy by-products is about 150° C. and therefore the process temperature in rerun column 40 is generally limited to 140° C., with 150° C. on the hot side of the heat exchanger surface. The charge to rerun column 40 is preheated by heat exchanger 38 to a temperature of 140° C. at an absolute pressure of 50 mm. of mercury, a superheat of approximately 50° C. on the dimethyl hydrogen phosphite vapors, in order to supply sufficient heat to column 40 to effect the desired fractionation. The non-vaporized by-products pass downwardly countercurrent to methyl chloride vapors introduced at the bottom of the column by conducting methyl chloride from line 31 already mentioned, through branch line 42, valve 43, heat exchanger 44 and line 45 to the bottom of column 40. This stripping of the high-boiling by-products in column 40 with methyl chloride vapors, improves the recovery of dimethyl hydrogen phosphite from said high-boiling by-products. Column 40 may also be equipped with bubble decks in order to provide sufficient vapor-liquid contact. For this purpose, low pressure decks are preferred to avoid extensive pressure drop through the column. From the top of rerun column 40, the dimethyl hydrogen phosphite and small amounts of methyl chloride contained therein are passed through line 46, cooler 47, from which the liquefied dimethyl hydrogen phosphite and non-condensed vapors are directed through line 48 to receiver 49. The non-condensed vapors from receiver 49 are directed through line 50 to vacuum pump 51 which discharges said vapors through line 52 and thence by way of line 33 into stripper 18, already described. The vapors so returned through lines 52 and 33 to stripper 18 contain about 15 wt. per cent of dimethyl hydrogen phosphite.

Dimethyl hydrogen phosphite collected in receiver 49 is withdrawn therefrom through line 53 by pump 54 which discharges through line 55 into line 56 containing valve 57 from which the dimethyl hydrogen phosphite is directed to storage not indicated in the diagrammatic drawing. A portion of the dimethyl hydrogen phosphite being discharged by pump 54 through line 55 is thereby conducted to near the top of rerun column 40 to act as reflux liquid and to assist in controlling the temperature and fractionation therein. From the bottom of rerun column 40, the high-boiling by-products, boiling higher than dimethyl hydrogen phosphite, are withdrawn through line 58, cooler 59, and valve 60, to waste storage or other use not indicated in the diagrammatic drawing.

As an alternative, to the above-indicated method of operating rerun column 40, it is also sometimes desirable to use a naphtha fraction or other material with a boiling range higher than that of the dimethyl hydrogen phosphite as a means of supplying heat and to serve as a stripping medium in this rerun column. With this use of naphtha, it would not be necessary to admit methyl chloride vapors through lines 42 and 45, but the naphtha could be charged to rerun column 10 by means not indicated in the attached diagrammatic drawing. With such a method of operation, the vapors taken overhead from the top of the rerun column could then all be condensed and thus decrease the required capacity of the vacuum pump to be employed. The bulk of the naphtha could be retained in the column, the column could be reboiled by adding sufficient heat by heat exchanger 44 or by other means not illustrated in the drawing, and the small amount of naphtha removed with the overhead vapors or with the higher boiling material withdrawn from the bottom of the column could be recovered as a separate layer for return to the rerun column. Such a method of operation would permit the use of a higher column pressure in the range of from about 50 mm. of mercury to one atmosphere absolute (760 mm.) with its resultant saving in cost of plant and operation.

The mixture of hydrogen chloride and methyl chloride separated as hereinbefore set forth in stripper 18 and directed therefrom through line 27 and valve 28 is passed through heat exchanger 61 through which steam or some other heating medium is circulated to insure vaporization of the mixture of hydrogen chloride and methyl chloride which is conducted through line 62 to suction tank 63 connected by line 64 to compressor 65 which discharges through line 66 into cooler 67 from which the liquefied mixture of methyl chloride and hydrogen chloride is conducted through line 68 to receiving tank 69. While only one stage of a compressor system for the hydrogen chloride-methyl chloride mixture is shown in the attached diagrammatic drawing, a multiple-stage compressor system may also be employed, for example, a three-stage compressor system, in order to produce a liquefied mixture of hydrogen chloride and methyl chloride.

From receiver 69, the liquefied mixture of hydrogen chloride and methyl chloride is withdrawn through line 70 by pump 71, which discharges through line 72 and valve 73 into fractionator 74 of suitable design such as a vertical cylindrical vessel packed with one or more beds or sections of carbon Raschig rings or other suitable tower packing material. For example, the vapors discharged from compressor 65 are condensed in a water-cooled condenser such as condenser 67 and then directed through line 68 to receiver 69 from which the condensate is pumped through line 70 by pump 71 and discharged through line 72 and valve 73 into fractionator 74 operated at an absolute pressure of 25 atmospheres, and in which the hydrogen chloride vapors are separated from methyl chloride. The hydrogen chloride so separated is discharged from the top of fractionator 74 through line 75 and valve 76 to storage or to other use not indicated in the diagrammatic drawing. The top of fractionator 74 is provided with liquid reflux by directing the vapors from the top of fractionator 74 through line 77 to heat exchanger 78 which is refrigerated by means of methyl chloride recovered in the process and directed to and away from heat exchanger 78 by lines 79 and 80, respectively. From heat exchanger 78, the reflux condensate formed therein from the vapors introduced through line 77 is discharged through line 81 into the top of fractionator 74. If desired, the top of fractionator 74 may be cooled sufficiently to remove the hydrogen chloride stream as a liquid through line 75 and valve 76.

From the bottom of fractionator 74, the methyl chloride is removed as a liquid through line 83, passed through cooler 84, and through lines 85 and 86 to receiver 87. Also a portion of the methyl chloride which is being withdrawn through line 83 may be directed therefrom through line 88, heat exchanger 89, and be returned through line 90 to the bottom of fractionator 74 to supply heat thereto and serve as a reboiler means. Vapors of methyl chloride present in receiver 87 may be discharged therefrom through line 31 and directed therefrom through line 33 and valve 34 already mentioned to the bottom of reactor stripper 18 to assist in the separation of hydrogen chloride from the reaction products. A portion of the liquid methyl chloride is directed from receiver 87 through line 79 already mentioned, containing valve 91 to heat exchanger 78 maintained, for example, at a temperature of about −18° C. as hereinbefore set forth. From heat exchanger 78 vaporized methyl chloride is conducted through line 80 to suction tank 92 and from thence by line 93 to refrigeration compressor 94 which discharges through line 95 into cooler 96 in which the compressed methyl chloride vapors are liquefied and the resultant liquid methyl chloride is conducted from condenser 96 through line 86, already mentioned, to receiver 87. Some of the liquid methyl chloride contained in receiver 87 is withdrawn therefrom through line 97 and valve 98 to storage, while another portion of the liquid methyl chloride being directed through line 97 is conducted therefrom through line 99, containing valve 100, and recycled to cooler 6 employed for precooling the charged methanol and phosphorus trichloride by indirect heat exchange with vaporizing methyl chloride as hereinbefore set forth.

It may be noted, however, that the drawing and the foregoing described embodiment are merely illustrative and that minor modifications or substitutions in design and construction may be made within the scope of the present invention. For example, suitable contact decks such as bubble trays or side-to-side pans may well be used within the upper and lower contacting sections of the reactor stripping column 18 in place of the Raschig rings or other packing material. Also, in some instances it may be desirable to utilize a packing material with the rerun column 40 instead of the perforated plates or decks which have been described and shown in connection with the present embodiment. The drawing also indicates a multi orifice flow mixing means 17 connecting with and discharging into the central vapor disengaging space of the reactor-stripping column 19, however, it is not intended to limit the unitary apparatus to the use of any one specific type of orifice or flow mixing means, as long as such mixing means may be directly adjacent to and attached with the column in a manner discharging an intimately mixed reaction stream directly into the middle portion of the column.

We claim as our invention:

1. An apparatus of the class described comprising a vertical chamber having upper and lower packed sections, a reactant stream flow mixer connected to the chamber and discharging into a vapor disengaging space between said packed sections, a vaporizing chamber and means for introducing thereto a liquid to be vaporized, a pair of reactant cooling coils disposed within said vaporizing chamber and connected with said mixer, means for passing vapors from the vaporizing chamber into the lower portion of said vertical chamber, and outlet means at the upper and lower ends of the last-named chamber.

2. The apparatus of claim 1 further characterized in the provision of means for passing liquid from said vaporizing chamber into said vertical chamber.

3. The apparatus of claim 1 further characterized in the provision of means for passing liquid from said vaporizing chamber into the upper portion of said vertical chamber.

4. The apparatus of claim 1 further characterized in the provision of means for passing liquid from said vaporizing chamber into said vertical chamber at vertically spaced points in the height thereof.

5. The apparatus of claim 1 further characterized in the provision of means for passing liquid from said vaporizing chamber into the lower packed section of said vertical chamber.

References Cited in the file of this patent

UNITED STATES PATENTS

| Number | Name | Date |
|---|---|---|
| 2,081,322 | Carney | May 25, 1937 |
| 2,224,925 | Potts et al. | Dec. 17, 1940 |
| 2,332,493 | Petry et al. | Oct. 19, 1943 |
| 2,371,477 | Sonders, Jr. et al. | Mar. 13, 1945 |
| 2,433,060 | Ohsol et al. | Dec. 23, 1947 |
| 2,582,817 | Chadwick | Jan. 15, 1952 |